United States Patent
Simonis et al.

(10) Patent No.: US 12,263,755 B2
(45) Date of Patent: Apr. 1, 2025

(54) METHOD AND APPARATUS FOR PREDICTING A STATE OF HEALTH OF A DEVICE BATTERY IN A BATTERY-OPERATED DEVICE

(71) Applicant: Robert Bosch GmbH, Stuttgart (DE)

(72) Inventors: Christian Simonis, Leonberg (DE); Stefan Schindler, Bietigheim-Bissingen (DE)

(73) Assignee: Robert Bosch GmbH, Stuttgart (DE)

( * ) Notice: Subject to any disclaimer, the term of this patent is extended or adjusted under 35 U.S.C. 154(b) by 588 days.

(21) Appl. No.: 17/537,825

(22) Filed: Nov. 30, 2021

(65) Prior Publication Data

US 2022/0169148 A1 Jun. 2, 2022

(30) Foreign Application Priority Data

Dec. 2, 2020 (DE) .................. 10 2020 215 204.7

(51) Int. Cl.
*B60L 58/16* (2019.01)
*H01M 10/42* (2006.01)

(52) U.S. Cl.
CPC .......... *B60L 58/16* (2019.02); *H01M 10/42* (2013.01); *H01M 2220/20* (2013.01)

(58) Field of Classification Search
CPC .. G01R 31/392; G01R 31/367; G01R 31/389; G01R 31/3842; G01R 31/52; G01R 31/382; G01R 31/3648; G01R 31/387; G01R 31/396; G01R 31/50; Y02E 60/10; H01M 2220/20; H01M 10/482; H01M 10/0525; H01M 10/48; B60L 58/12; B60L 58/16; H02J 7/0048; H02J 7/005
See application file for complete search history.

(56) References Cited

U.S. PATENT DOCUMENTS

| | | | | |
|---|---|---|---|---|
| 6,586,940 B2 * | 7/2003 | Asakura | ............... | G01R 31/392 |
| | | | | 324/426 |
| 10,466,304 B2 * | 11/2019 | Sung | ................ | B60L 58/12 |
| 11,054,481 B2 * | 7/2021 | Christophersen | .... | G01R 31/389 |
| 11,340,308 B1 * | 5/2022 | Schreiber | ............. | G01R 31/396 |

(Continued)

FOREIGN PATENT DOCUMENTS

| | | |
|---|---|---|
| DE | 10 2015 001 050 A1 | 8/2016 |
| DE | 10 2017 125 274 B3 | 3/2019 |

*Primary Examiner* — Vinh P Nguyen
(74) *Attorney, Agent, or Firm* — Maginot, Moore & Beck LLP

(57) ABSTRACT

The disclosure concerns a method for determining a predicted state of health of a device battery in a battery-operated machine. A state of health characteristic model for a state of health time characteristic is provided using a number of linked parameterizable characteristic functions that each indicate a state of health over a time period of ageing times, the characteristic functions being initially parameterized. A number of data points are captured that each indicate a state of health and an ageing time. A parameter of one of the characteristic functions is adapted based on the data points in the respective time periods of the characteristic functions. A parameter of another of the characteristic functions, for which there is no data point available, is also adapted. The state of health characteristic model is provided based on the adapted characteristic functions.

17 Claims, 3 Drawing Sheets

(56) References Cited

U.S. PATENT DOCUMENTS

| | | | |
|---|---|---|---|
| 11,656,293 B2 * | 5/2023 | Huelsing | G01R 31/3828 |
| | | | 324/426 |
| 11,733,313 B2 * | 8/2023 | Simonis | G01R 31/367 |
| | | | 702/63 |
| 11,835,589 B2 * | 12/2023 | Simonis | B60L 58/16 |
| 11,938,838 B2 * | 3/2024 | Simonis | G01R 31/392 |
| 2013/0090900 A1 | 4/2013 | Gering | |
| 2021/0033675 A1 | 2/2021 | Ukumori | |

* cited by examiner

METHOD AND APPARATUS FOR PREDICTING A STATE OF HEALTH OF A DEVICE BATTERY IN A BATTERY-OPERATED DEVICE

This application claims priority under 35 U.S.C. § 119 to application no. DE 10 2020 215 204.7, filed on Dec. 2, 2020 in Germany, the disclosure of which is incorporated herein by reference in its entirety.

TECHNICAL FIELD

The disclosure relates to battery-operated machines, such as electrically driveable motor vehicles, in particular electric vehicles or hybrid vehicles, and also to measures for determining a state of health (SOH) of an electrical energy storage unit for a battery-operated machine.

BACKGROUND

Energy is supplied to battery-operated machines and devices, such as in particular electrically driveable motor vehicles, using a device battery, such as e.g. a vehicle battery. This supplies electrical energy in order to operate machine systems. The state of health of the device battery deteriorates appreciably over the course of its life, resulting in a declining maximum storage capacity. An extent of the ageing of the device battery is dependent on an individual loading of the device battery, that is to say on the usage behavior of a user, and on the type of device battery.

Although a physical ageing model may be used to determine the present state of health based on historical operating variable characteristics, this model is often highly inaccurate. This inaccuracy of the conventional ageing model hampers prediction of the state of health characteristic. However, the prediction of the characteristic of the state of health of the device battery energy storage unit is an important technical variable, since it allows a financial assessment of a residual value of the device battery.

SUMMARY

According to the disclosure, there is provision for a method for determining a predicted state of health of a device battery in a battery-operated machine, in particular of an electrically driveable motor vehicle, and an apparatus and a battery-operated machine.

Further configurations are specified in the embodiments.

According to a first aspect, there is provision for a method for determining a predicted state of health of a device battery in a battery-operated machine, in particular in an electrically driveable motor vehicle, comprising the following steps:
providing a state of health characteristic model for a state of health time characteristic, which indicates a characteristic of the state of health of the device battery since startup of the device battery, by means of a number of linked parameterizable characteristic functions that each indicate a state of health over a time period of ageing times, wherein the characteristic functions are initially parameterized;
capturing a number of data points that each indicate a state of health and an ageing time, assigned to the respective state of health, for indicating an age of the device battery beginning with startup of the device battery;
adapting at least one parameter of one or more of the number of parameterizable characteristic functions on the basis of the ascertained data points in the respective time periods of the characteristic functions, in order to parameterize the relevant characteristic functions;
adapting at least one parameter of at least one of the other parameterizable characteristic functions, for whose time period there is no data point available, on the basis of the parameterized characteristic functions;
providing the state of health characteristic model on the basis of the adapted characteristic functions.

In order to be able to predict the state of health of a device battery, it is necessary to provide a suitable state of health characteristic model. The state of health characteristic model indicates a state of health of the device battery on the basis of the ageing time of the device battery. The ageing time indicates the age of the device battery beginning with the startup time of the device battery.

However, the state of health characteristic model needs to be created based on empirical values, i.e. measured characteristics of states of health of device batteries that have already reached their end of life, for example in the laboratory or alternatively in the field. This is usually the case only after some time, in particular after a few years, in particular if a new battery type is involved.

In order to allow long-term prediction of the state of health of device batteries even if complete capture of characteristics of the states of health of existing device batteries of the same type is not yet available or only small sets of relevant data are available, it is not possible to use a conventional state of health model, in particular a conventionally data-based state of health model.

The above method allows a state of health characteristic that stands out after just a relatively short period after startup of the device battery to be taken as a basis for predicting a state of health by using a functional state of health characteristic. It is thus also possible to use the state of health characteristic to plausibility-check ascertained data points comprising state of health and the applicable ageing time, and therefore to allow the degradation behavior of the device battery to be monitored.

The state of health characteristic is divided into multiple characteristic functions that describe an S-curve that essentially corresponds to a possible ageing characteristic of a device battery. The S-curve has a sharply falling characteristic with positive curvature for early ageing times, a substantially almost linear characteristic for middle ageing times and a sharply falling characteristic with negative curvature for later ageing times. The S-curve is made up, in sections, of a nonlinear characteristic function in a first time period after the startup time, a linear function in a second time period, which follows the first time period, and a further nonlinear function in a third time period, which follows the second time period. The characteristic functions of the time periods of ageing times are combined to form a state of health characteristic model that indicates the state of health characteristic.

The further course of the whole state of health characteristic is determined simply by adapting the characteristic functions based on data points whose ageing times are close to the startup time. As a result, such an adapted state of health model gradually allows more precise prediction of the remaining life or the actual characteristic of the state of health of the relevant device battery. Moreover, it becomes possible for the prediction model and the accompanying characteristic functions to be continually improved in a more extensive data situation as a result of learning from fleet data.

The characteristic functions in the individual time periods are parameterizable functions that are adapted based on the data points that have been obtained from the device battery. The function characteristics are linked to one another in a rule-based manner, in particular by way of continuity conditions of the characteristic variable, or the first time derivative thereof, i.e. no sudden change occurs at the transition between the function sections, and the curve of the state of health characteristic model is monotonous. When adapting the parameters of a function characteristic in one time period, the transition to the function characteristic of the respective subsequent time period can thus shift, as a result of which the parameters thereof are accordingly adapted from the initially predefined or previously determined parameters. This gradually results in adaptation of the state of health characteristic model.

As such, the state of health characteristic model can be taken as a basis for predicting a time at which a specific state of health is reached, in particular an end of life of the device battery or a remaining life of the device battery, with nonlinearities being able to be taken into consideration in the best possible way in an early phase already.

Alternatively or additionally, a state of health of a device battery at an ageing time is compared against the modelled state of health of the state of health characteristic model for the ageing time, wherein a deviation of more than a predefined threshold value is signalled.

Moreover, all or part of the method can be performed in a device-external central processing unit communicatively connected to a multiplicity of battery-operated machines.

The state of health characteristic model can have two or three characteristic functions, wherein the first characteristic function has a positive curvature and the last characteristic function has a negative curvature, as a result of which an S-shaped characteristic is produced overall.

Moreover, the at least one parameter of the at least one of the other parameterizable characteristic functions can be adapted such that a continuous transition between the adjacent characteristic functions is achieved. Besides the continuous transition for the characteristic variable, the curve gradient is moreover also continuous at the transition between the sectional functionals.

In particular, the adapting of the at least one parameter of the at least one of the other characteristic functions can comprise an offset shift.

Moreover, the number of data points can be captured by using an empirical, physical, electrochemical, data-based or hybrid state of health model on the basis of operating variables of the battery-operated machine.

According to a further aspect, provision is made for an apparatus for determining a predicted state of health of a device battery in a battery-operated machine, in particular in an electrically driveable motor vehicle, wherein the apparatus is designed to:
provide a state of health characteristic model for a state of health time characteristic, which indicates a characteristic of the state of health of the device battery since startup of the device battery, by means of a number of linked parameterizable characteristic functions that each indicate a state of health over a time period of ageing times, wherein the characteristic functions are initially parameterized;
capture a number of data points that each indicate a state of health and an ageing time, assigned to the respective state of health, for indicating an age of the device battery beginning with startup of the device battery;
adapt at least one parameter of one or more of the number of parameterizable characteristic functions on the basis of the ascertained data points in the respective time periods of the characteristic functions, in order to parameterize the relevant characteristic functions;
adapt at least one parameter of at least one of the other parameterizable characteristic functions, for whose time period there is no data point available, on the basis of the parameterized characteristic functions;
provide the state of health characteristic model on the basis of the adapted characteristic functions.

BRIEF DESCRIPTION OF THE DRAWINGS

Embodiments are explained in more detail below with reference to the appended drawings, in which.

DETAILED DESCRIPTION

The method according to the disclosure is described below on the basis of vehicle batteries as device batteries in a motor vehicle as battery-operated device or battery-operated machine. This example is representative of a multiplicity of stationary or mobile battery-operated machines and devices with a mains-independent energy supply, such as for example vehicles (electric vehicles, pedelecs, etc.), installations, machine tools, domestic appliances, IOT devices, a building energy supply, aircraft, in particular drones, autonomous robots and consumer electronics devices, in particular cell phones, and the like, that are connected to a central processing unit (cloud) by way of an appropriate communication connection (e.g. WLAN/LAN, Internet (such as 5G)).

Figure 1:
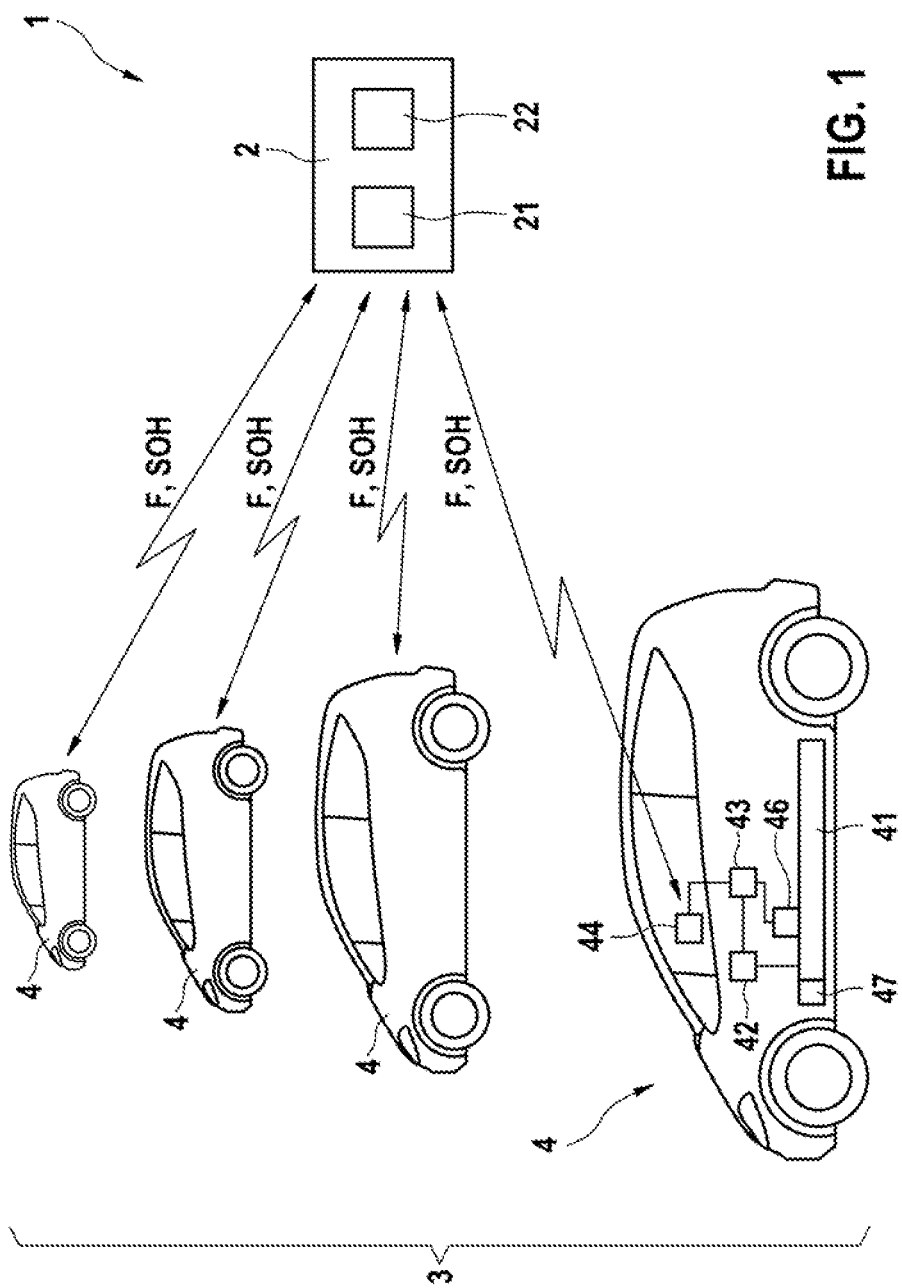
FIG. 1 shows a schematic depiction of a system for providing driver-specific and vehicle-specific operating variables with regard to the operation of a vehicle battery of vehicles of a vehicle fleet to a central processing unit.

FIG. 1 shows a system 1 for collecting fleet data in a central processing unit 2 for the purpose of creating and operating and also evaluating a state of health model. The state of health model is used to determine a state of health of the vehicle battery in a motor vehicle. FIG. 1 shows a vehicle fleet 3 with multiple motor vehicles 4. A characteristic of a state of health of the vehicle battery of a respective motor vehicle 4 of the vehicle fleet 3 is intended to be predicted in the central processing unit 2 based on the fleet data.

One of the motor vehicles 4 is illustrated in more detail in FIG. 1. The motor vehicles 4 each have a vehicle battery 41 as a rechargeable electrical energy storage unit, an electric drive motor 42 and a control unit 43. The control unit 43 is connected to a communication module 44 that is suitable for transferring data between the respective motor vehicle 4 and the central processing unit 2 (a so-called cloud). The control unit 43 is connected to a sensor unit 46 that has one or more sensors in order to continuously capture operating variables.

The motor vehicles 4 transmit the operating variables F, which at least indicate variables that influence the state of health of the vehicle battery, to the central processing unit 2. In the case of a vehicle battery 41, the operating variables F may indicate a present battery current, a present battery voltage, a present battery temperature and a present state of charge (SOC), at pack, module and/or cell level alike. The operating variables F are captured in a fast time frame of between 2 Hz and 100 Hz and may be transferred to the central processing unit 2 in uncompressed and/or compressed form on a regular basis. By way of example, the time series may be transferred to the central processing unit 2 in blocks at intervals of between 10 min and several hours.

Operating features that relate to an evaluation period may be generated from the operating variables F in the central processing unit 2, or in other embodiments also in the respective motor vehicles 4 already. The evaluation period for determining the state of health may be between a few hours (for example 6 hours) and several weeks (for example one month). A customary value for the evaluation period is one week.

The central processing unit 2 has a data processing unit 21, in which the method described below is able to be performed, and a database 22 for storing states of health with the respective associated ageing times of the vehicle batteries 41 of a multiplicity of vehicles 4 of the vehicle fleet 3.

State of health (SOH) is the key variable for indicating a remaining battery capacity or remaining battery charge. The state of health is a measure of the ageing of the vehicle battery or of a battery module or of a battery cell and can be indicated as a capacity retention rate (SOH-C) or as a rise in internal resistance (SOH-R). The capacity retention rate SOH-C is indicated as a ratio of the measured present capacity to an initial capacity of the fully charged battery. The relative change in internal resistance SOH-R rises as the battery ages.

A state of health model that is in particular fully or partially data-based is implemented in the central processing unit 2. The state of health model can be used on a regular basis, that is to say after the respective evaluation period has elapsed, to ascertain the present state of health of the vehicle battery 41 in a manner known per se based on the time characteristics of the operating variables or other operating features. The state of health can be determined, for example based on an electrochemical model or other model, on the basis of the received operating variables F for each of the vehicle batteries 41.

Alternatively, there may be provision in the vehicle battery 41 for a battery control unit 47 with an implemented state of health model. Said model can ascertain a state of health SOH in the vehicle battery 41 already and provide said state of health for transmission to the central processing unit 2.

The state of health is assigned to the ageing time of the relevant vehicle battery 41, and such a data point for creating a state of health characteristic In other words, it is possible to ascertain a state of health of the relevant vehicle battery 41 based on the operating features obtained from the operating variable characteristics of one of the motor vehicles 4 of the fleet 3.

Figure 2:
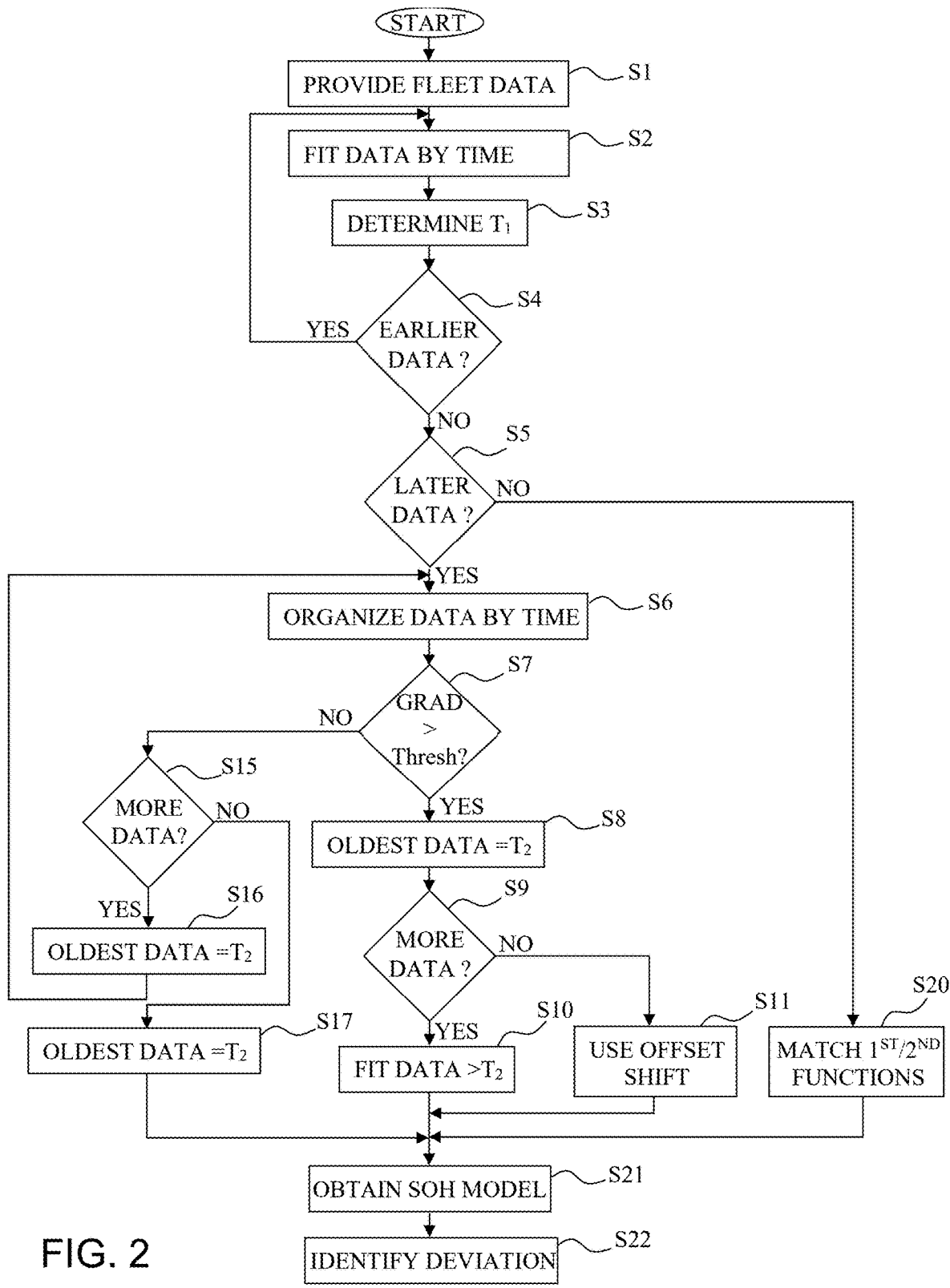
FIG. 2 shows a flowchart to illustrate a method for ascertaining a predicted state of health characteristic for a vehicle battery in a motor vehicle using a data-based state of health model.
Figure 3:
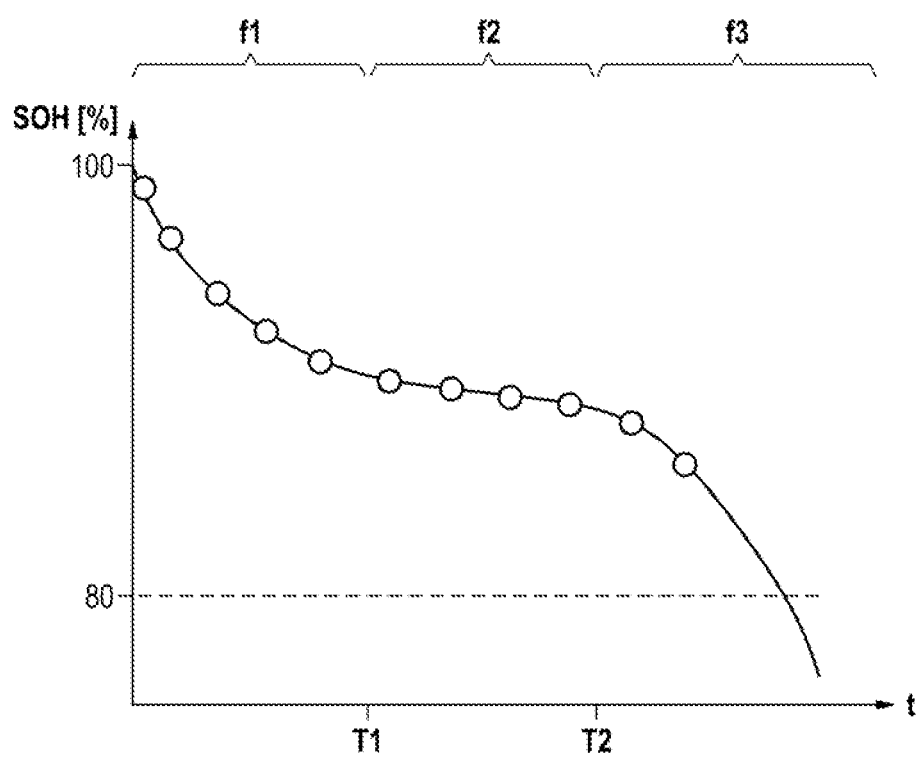
FIG. 3 shows a depiction of a state of health characteristic model with three characteristic functions for illustrative data points.

FIG. 2 shows a flowchart to illustrate a method for ascertaining a state of health characteristic model in the central processing unit. By way of illustration, the state of health characteristic model is formed from three adjacent characteristic functions, each of which is initially parameterized. The characteristic functions each map a state of health SOH over an ageing time t. By way of illustration, FIG. 3 shows a possible state of health characteristic model with three characteristic functions, in sections, for illustrative data points.

In step S1, the vehicle fleet 3 provides data points, each comprising a state of health SOH and an associated ageing time, from the multiplicity of vehicle batteries 41. The states of health SOH can, on the one hand, be provided to the central processing unit 2 by the battery control unit 47 of the vehicle battery 41 of vehicles of the vehicle fleet 3 or, on the other hand, can be created from the operating variables F in the central processing unit 2 based on an applicable state of health model.

In step S2, the central processing unit 2 takes a chronological order of the ageing times of the data points starting from the respective ageing time t=0 (i.e. the youngest ageing time) as a basis for determining of the startup of the vehicle battery 41 and gradually ascertains a first characteristic function in a first time period in accordance with an illustrative model function $$f1 = A1 * t^{A2} + A3f1.$$

To this end, a set of data points is selected in accordance with the order and the model function is parameterized by fitting, as a result of which the parameters A1, A2, A3 are determined, wherein predefined constraints apply. These initial assumptions for the parameters originate from expert/domain knowledge or from prior application of the method to fleet data with comparable device batteries. The aforementioned parameters can be improved a posteriori by learning from fleet data. A3 is normally chosen such that SOH (startup time)=1.

In step S3, a first transition time T1 is determined, at which the first characteristic function has a gradient whose absolute value is lower than a predefined first gradient threshold value. The first gradient threshold value is also a parameterizable value that can be improved a posteriori over the further course of the method by learning from fleet data. The first gradient threshold value can be determined by an optimization method from complete ageing trajectories that are obtained from data points of state of health values up to an end of life of the relevant vehicle battery, wherein the target criterion of the optimization method corresponds to a minimization of a deviation between the state of health trajectory formed by the data points and the state of health characteristic model.

In step S4, a check is performed to determine whether, for the time period before the first transition time T1, there are still data points available that were not considered for fitting the first characteristic function in step S2. If this is the case (alternative: Yes), the method returns to step S2 and the set of data points that is considered is all of the data points up to the previously determined first transition time. Otherwise (alternative: No), the method continues with step S5.

In step S5, a check is performed to determine whether there are further data points available after the first transition time. If this is the case (alternative: Yes), the method continues with step S6. Otherwise (alternative: No), the method continues with step S20.

In step S6, the data points are determined based on their chronological order starting from the first transition time T1, and a second characteristic function is gradually ascertained in a second time period, which follows the first, in accordance with an illustrative model function $$f2 = B1 * t + B2.$$

To this end, a set of data points is selected in accordance with the order starting from the first transition time T1 and the model function is parameterized by fitting, as a result of which the parameters B1, B2 are determined. Initial assumptions for the parameter B1 originate from expert/domain knowledge or from prior application of the method to fleet data with comparable energy storage systems. The parameters B1 can be improved a posteriori by learning from fleet data. The parameter B2 is obtained from the required continuity condition of the characteristic variable, or preferably also of the gradient of the characteristic variable. To that end, B1 and B2 are chosen such that at least in the first derivative of f1 and f2 there is a continuity at the first transition time T1 between the two characteristic functions.

In step S7, a check is performed to determine whether the second characteristic function has a gradient whose absolute value exceeds a second gradient threshold value. If this is the case (alternative: Yes), the ageing time of the oldest data point considered is assumed to be the second transition time T2 in step S8, and the method continues with step S9. Otherwise (alternative: No), the method continues with step S15. The second gradient threshold value is a parameterizable value that can be improved a posteriori over the further course of the method by learning from fleet data.

The second gradient threshold value can be determined by a further optimization method from complete ageing trajectories that are obtained from data points of state of health values up to an end of life of the relevant vehicle battery, wherein the target criterion of the optimization method corresponds to a minimization of a deviation between the state of health trajectory formed by the data points and the state of health characteristic model.

In step S9, a check is performed to determine whether there are further data points available. If this is the case (alternative: Yes), the parameters of the third characteristic function are determined in step S10 by fitting to the data points with ageing times from the second transition time T2 onward. By way of example, the third characteristic function can assume a form $$f3 = C1 + C2 * e^{(C3*t)}.$$

Initial assumptions for the parameters C2, C3 originate from expert/domain knowledge or from prior application of the method to fleet data with comparable energy storage systems. They can be improved a posteriori by learning from fleet data. The parameter C1 is obtained from the required continuity condition. C2 and C3 are preferably chosen such that at least in the first derivatives of f2 and f3 there is a continuity at the second transition time T2 between the two characteristic functions.

If step S9 determines that there are no further data points available, the third characteristic function is adapted in step S11 by means of an offset shift such that the transition between the second characteristic function and the third characteristic function is continuous.

In step S9, the third characteristic function f3 is parameterized using the data points, from the second transition point T2 onward.

In step S10, a state of health characteristic model is then available that is determined by three characteristic functions.

In step S15, a check is performed to determine whether there are further data points available. If this is the case (alternative: Yes), the set of data points is increased in step S16 and the method returns to step S6. Otherwise (alternative: No), the method continues with step S17.

In step S17, the third initially parameterized characteristic function is matched to the most recently ascertained second characteristic function such that a continuous and monotonous transition takes place between the second and third characteristic functions. This can be achieved by means of a gradient adaptation for the third characteristic function, e.g. by adapting the parameter C2.

In step S20, the second initially parameterized characteristic function is matched to the most recently ascertained first characteristic function such that a continuous and monotonous transition takes place between the first and second characteristic functions. Subsequently, the third initially parameterized characteristic function is matched to the adapted second characteristic function in this way. This can be achieved by means of a gradient adaptation for the second characteristic function, e.g. by adapting the parameter B1, and subsequently of the third characteristic function, e.g. by adapting the parameter C2.

The state of health characteristic model is obtained from the function characteristics in step S21, said model being able to be used to calculate states of health, to predict states of health and to determine a remaining life or to plausibility-check states of health of individual vehicle batteries 41.

By way of example, it is thus possible for a deviation in a state of health of the vehicle battery to be compared in step S22 with the state of health predicted by the state of health characteristic model and for a deviation above a predefined threshold value to indicate sudden ageing of the vehicle battery 41. In an advantageous configuration, a check is moreover performed to determine whether T1 and T2 are representative of the typical behavior of other fleet batteries in question. The information contained in T1 and T2 can thus be used to monitor life and to assess the health of the energy storage unit. Atypical ageing characteristics can be identified within the fleet context.

What is claimed is:

1. A method, which is computer-implemented, for determining a predicted state of health of a device battery in a battery-operated machine, comprising:
providing a state of health characteristic model including
a plurality of initial characteristic functions, wherein
each of the plurality of initial characteristic functions
models respective states of health over respective
time periods of ageing,
each of the plurality of initial characteristic functions is
linked to at least one of the other plurality of initial
characteristic functions, and
each of the plurality of initial characteristic functions is
defined by a respective plurality of initial parameters;
capturing a data point that indicates (i) a state of health of
the device battery, and (ii) a first ageing time that is
assigned to the state of health;
associating the captured data point with a first of the
plurality of initial characteristic functions based upon
the assigned first ageing time;
adapting the first of the plurality of initial characteristic
functions based on the associated data point to generate
a modified first characteristic function defined by a
modified first plurality of parameters;
adapting at least one parameter of a second characteristic
function of the plurality of initial characteristic functions based on the modified first characteristic function
to generate a modified second characteristic function
linked to the modified first characteristic function;
providing a modified state of health characteristic model
based on the modified first characteristic function and
the modified second characteristic function; and determining the predicted state of health of the device battery using the provided modified state of health characteristic model.

2. The method according to claim 1, further comprising: predicting, based on the modified state of health characteristic model, a time at which a determined state of health will be is reached.

3. The method according to claim 2, wherein the determined predicted state of health is one of (i) an end of life of the device battery and (ii) a remaining life of the device battery.

4. The method according to claim 1 further comprising: determining a deviation by comparing the data point against the state of health characteristic model at the first ageing time; and signaling the deviation in response to the deviation exceeding a predefined threshold value.

5. The method according to claim 1, wherein: at least one of (i) the providing the state of health characteristic model, (ii) the capturing the data point, (iii) the adapting the at least one parameter of the at least one first characteristic function, (iv) the adapting the at least one parameter of the second characteristic function, and (v) the providing the modified state of health characteristic model, is performed by a central processor, the central processor a device-external central processor that is communicatively connected to a plurality of battery-operated machines; and the battery-operated machine is one of the plurality of battery-operated machines.

6. The method according to claim 1, wherein: the plurality of initial characteristic functions of the state of health characteristic model includes one of (i) two initial characteristic functions and (ii) three initial characteristic functions; a characteristic function of the plurality of characteristic functions with the respective time period having of a lowest ageing time has a positive curvature; and a characteristic function of the plurality of characteristic functions with the respective time period having a highest ageing time has a negative curvature, such that the plurality of characteristic functions overall has an S-shaped characteristic.

7. The method according to claim 1, the adapting the at least one parameter of the second characteristic function further comprising: adapting the at least one parameter of second characteristic function such that a continuous transition between the modified first characteristic function and the modified second characteristic function is achieved.

8. The method according to claim 7, the adapting the at least one parameter of the second characteristic function further comprising: shifting an offset of the second characteristic function.

9. The method according to claim 1 further comprising: capturing at least one new data point; and re-adapting the plurality of characteristic functions using the at least one new data point.

10. The method according to claim 1 further comprising: determining at least one transition time based on a gradient of the modified first characteristic function; and setting the at least one transition time as an initial ageing time for the modified second characteristic function, wherein the modified first characteristic function has an earlier time period.

11. The method according to claim 1, the capturing the data point further comprising: capturing the data point using one of (i) a physical state of health model, (ii) an electrochemical state of health model, (iii) a data-based state of health model, and (iv) a hybrid state of health model.

12. An apparatus for determining a predicted state of health of a device battery in a battery-operated machine, the apparatus being configured to perform the method of claim 1.

13. The apparatus according to claim 12, wherein the battery-operated machine is an electrically driveable motor vehicle.

14. The method according to claim 1, wherein a computer program has instructions that are executed by at least one data processing device to cause the at least one data processing device to carry out the method.

15. A non-transitory machine-readable storage medium for determining a predicted state of health of a device battery in a battery-operated machine, the non-transitory machine-readable storage medium storing instructions of a computer program that, when executed by at least one data processing device, cause the at least one data processing device to perform the method of claim 1.

16. The method according to claim 1, wherein the battery-operated machine is an electrically driveable motor vehicle.

17. The method according to claim 1, further comprising: indicating a remaining battery capacity based upon the determined predicted state of health.

* * * * *